United States Patent [19]

Tjon-Joe-Pin et al.

[11] Patent Number: 5,224,544
[45] Date of Patent: Jul. 6, 1993

[54] ENZYME COMPLEX USED FOR BREAKING CROSSLINKED CELLULOSE BASED BLOCKING GELS AT LOW TO MODERATE TEMPERATURES

[75] Inventors: Robert M. Tjon-Joe-Pin; Allan R. Rickards, both of Houston, Tex.

[73] Assignee: BJ Services Company, Houston, Tex.

[21] Appl. No.: 842,041

[22] Filed: Feb. 26, 1992

[51] Int. Cl.⁵ .......................................... E21B 33/138
[52] U.S. Cl. ................................. 166/295; 166/294; 166/300
[58] Field of Search ............... 166/281, 294, 295, 300; 252/8.551

[56] References Cited

U.S. PATENT DOCUMENTS

| | | | |
|---|---|---|---|
| 2,681,704 | 6/1954 | Menaul | 252/8.551 X |
| 2,801,218 | 7/1957 | Menaul | 252/8.551 |
| 3,684,710 | 8/1972 | Cayle et al. | 252/8.551 |
| 4,157,116 | 6/1979 | Coulter | 166/281 X |
| 4,342,866 | 8/1982 | Kang et al. | 536/119 |
| 4,665,985 | 5/1987 | Berrod et al. | 166/281 |
| 4,713,449 | 12/1987 | Vanderslice et al. | 536/123 |
| 4,928,763 | 5/1990 | Falk | 166/300 X |
| 5,032,297 | 7/1991 | Williamson et al. | 166/305.1 X |
| 5,067,566 | 11/1991 | Dawson | 166/308 |

Primary Examiner—George A. Suchfield
Attorney, Agent, or Firm—Charles D. Gunter, Jr.; Susan L. Firestone

[57] ABSTRACT

A method of degrading a blocking gel in a subterranean formation of a well bore is shown in which a gellable blocking fluid is first formed by blending together an aqueous fluid, a hydratable polymer, a suitable cross-linking agent for crosslinking the hydratable polymer to form a polymer gel. The polymer gel may contain an enzyme breaker incorporated within. The cross-linked polymer gel is pumped into the well bore. If required, an externally applied enzyme breaker is added prior to gel degradation. The enzyme breaker is allowed to degrade the cross-linked polymer with time to reduce the viscosity of the fluid so that the fluid can be removed from the formation back to the well surface. The particular enzyme breaker utilized has an activity in the pH range from about 1.0 to 8.0 and is effective to attack only specific linkages in the cross-linked polymer gel.

27 Claims, No Drawings

ENZYME COMPLEX USED FOR BREAKING CROSSLINKED CELLULOSE BASED BLOCKING GELS AT LOW TO MODERATE TEMPERATURES

BACKGROUND OF THE INVENTION

1. Field of the Invention

The present invention relates to blocking gels of the type used in well bore operations and particularly to a method for producing a gradual reduction in the viscosity of a blocking gel through the use of enzymes either incorporated internally within the blocking gel or placed externally on the blocking gel.

2. Description of the Prior Art

Occasionally, production from well bore operations must cease temporarily to perform auxiliary procedures such as repairs at different depths of a subterranean formation. The repairs are called workover operations. Workover operations frequently use heavy brines and other fluids to maintain pressure control within the reservoir. The fluids can leak-off into the production zone, causing damage which interferes with the efficient operation of the well.

Isolating the production zone, however, protects it from damage. Specific blocking materials such as solid blocking agents or temporary blocking gels isolate the production formation. The solid blocking agents, for example nylon or rubber balls, are injected into the fluid stream and seal the production formation by physically stopping up perforations in the formation. When the injection ends, the material is no longer held against the perforations and falls to the bottom of the well.

The use of temporary blocking gels successfully protects the production zone. Blocking gels form by gellation of suitable polymers, such as appropriate polysaccharides. These gels produce a relatively impermeable barrier across the production formation. The barrier cordons off the production zone from the area undergoing the workover operations. The areas must remain separated until production is ready to resume.

Production resumes after removal of the blocking gel. The recovery of the blocking gel is accomplished by reducing the viscosity of the fluid to a low value such that it flows naturally from the formation under the influence of formation fluids and pressure. This viscosity reduction or conversion is referred to as "breaking" and is often accomplished by incorporating chemical agents, referred to as breakers, into the initial gel.

In addition to the importance of providing a breaking mechanism for the gelled fluid which facilitates recovery of the fluid and resumes production, the timing of the break is of great importance. Gels which break prematurely can damage the production zone through the leak-off of contaminating materials into the production formation.

On the other hand, gelled fluids which break too slowly can cause slow recovery of the blocking gel fluid from the production formation. Slow recovery delays the resumption of the production of formation fluids. Incomplete gel degradation causes a build up of residue, forming a filter cake which interferes with production from the formation.

For purposes of the present application, premature breaking will be understood to mean that the gel viscosity becomes diminished to an undesirable extent prior to the end of the workover operation. Thus, to be satisfactory, the gel viscosity should remain in the range from about 60% to 100% for the length of time required to complete the workover operation. Since some workover operations require extended periods of time before completion, the blocking gels should be capable of remaining appropriately viscous during that time period.

Optimally, the blocking gel will break when the auxiliary operations conclude. For practical purposes, the gel should be completely broken within a specific period of time after completion of the auxiliary operations. This period of time is dependent on the temperature of the formation. A completely broken gel means one that can be flushed from the formation by the flowing formation fluids. In the laboratory setting, gel viscosity is measured using a rotational viscometer such as a Fann 35VG meter or a Brookfield DVII digital viscometer. A completely broken, noncrosslinked gel regains greater than about 95% of the initial permeability of a formation sample using a gel damage permeability test.

By way of comparison, certain gels, such as those based upon guar polymers, undergo a natural break without the intervention of chemical additives. The breaking time for such gelled fluids is excessive, being somewhere in the range from greater than 24 hours to about two weeks at an exposure temperature of about 80° F. Accordingly, to decrease the break time of blocking gels, chemical agents are incorporated into the gel and become a part of the gel itself. Typically these agents are either oxidants or organic materials which degrade the polymeric gel structure.

However, obtaining controlled breaks using various chemical agents, such as oxidants or organic materials, has proved difficult. Common oxidants, for example persulfates, are ineffective at low temperature ranges from ambient temperature to 130° F. In this temperature range the oxidants are stable and do not readily undergo homolytic cleavage to initiate the degradation of the polymer structure. A gel break is typically achieved at lower temperatures only through the addition of high concentrations of oxidizers or the addition of a coreactant to initiate cleavage. High oxidizer concentrations are frequently poorly soluble under the treatment conditions. High oxidizer concentrations interfere with the polymer crosslinking, consequently forming unstable gels that can prematurely break. Common oxidants also break the blocking gel's polysaccharide backbone into nonspecific units, creating a mixture of monosaccharide, disaccharide and polysaccharide fragments as well as miscellaneous fragments. Further, common oxidants are difficult to control. Oxidants react with things other than the polymeric gel. Strong oxidizers react with the metals used for crosslinking the polymer, consequently weakening the gel and reducing long term stability. Oxidants can react with iron found in the formation, producing iron oxides which precipitate and damage the formation. Oxidants can also react nonspecifically with other materials used in the oil industry, for example, tubings, linings and resins.

To increase the efficiency of common oxidizers at lower temperatures, coreactants are often used as catalysts. One group of coreactants are antioxidizers, such as triethanolamine. Using antioxidants presents two additional problems. First, antioxidants such as triethanolamine are expensive to use in the quantities required for well operations. Secondly, internally incorporated antioxidants initiate breaks almost immediately. These are often rapid breaks which lead to the premature reduction of gel viscosity while degrading the gel incompletely, thereby damaging the production zone or allowing injection of the workover fluid.

Rather than using common oxidants, organic materials have been tried. One such material is sucrose. Sucrose gives slow internal breaks. Successful gel breaking requires high concentrations of sucrose, usually in excess of 600 pounds of sucrose per thousand gallons of gel. Sucrose can be difficult to solubilize at these high concentrations. The reduction of gel viscosity is also unsatisfactory. The ge is reduced only to the initial viscosity of the solution prior to gellation, reducing the efficiency of the recovery.

A second organic material tried is polyglycolic acid. Polyglycolic acid produces a slow reduction of viscosity of the gel. But this reduction breaks the gel incompletely, often damaging the formation.

To produce complete breaks with oxidants, sucrose or polyglycolic acid as internal breakers, additional treatment may be required. An extra acid hydrolysis step may be necessary to remove residual polymer residue. Treatment with an acid for example, hydrochloric acid, augments the gel breaking for complete breaks. Acid treatments corrode steel and equipment used in the operation.

Enzyme systems are known to degrade the types of polysaccharides used in blocking gels. Enzyme breaker systems have been designed to break gelled fracturing fluids used in the industry. See, for example, the copending application of Robert Tjon-Joe-Pin entitled "Enzyme Breaker For Galactomanna Based Fracturing Fluid", Application No. 07/842,038, filed Feb. 26, 1992, now U.S. Pat. No. 5,201,370, filed concurrently herewith. Enzymes, for example the cellulases, hemicellulases, amylases, pectinases, and their mixtures are familiar to those in the well service industry when used in fracturing gel breaker systems. These enzymes break the bonds that connect the monosaccharides into a polysaccharide backbone, for instance, the (1,4)-α-D-galactosiduronic linkages in pectin. These conventional enzymes are nonspecific and cause random breaks. Therefore using these conventional enzymes to break gelled fracturing fluids results in only a partial degradation of the polysaccharide polymer. Instead of fragmenting almost completely into much smaller fragments, these enzymes break the polysaccharide backbone into a mixture of fragments consisting of monosaccharides, disaccharides and polysaccharides. Larger fragments like disaccharides and polysaccharides can plug the formation. Since the breaks are nonspecific, conventional enzyme breakers can degrade other components used in the system.

The same results occur when used in a blocking gel system. The larger fragments increase the residue left in the formation once the gel is removed. Increased residue can damage the formation and decrease the productivity of the well bore operation by plugging the formation. For example, in a cellulose based system conventional breakers can only break the gel down to predominately polysaccharides. Traditional enzyme breaker systems may be able to degrade the cellobiose units further. However, this degradation is too slow and inadequate.

Incomplete breakdown of the gel can damage the production zone. Inadequately broken blocking gels produce formation permeability damage. Increasing the concentration of breakers to prevent incomplete breaking, decreases the amount of insoluble residue. Unfortunately, this may also increase gel instability, precluding long term gels.

The present invention has as its object to provide a break mechanism for a blocking gel which yields high initial viscosity with little change during auxiliary operations but which produces a rapid break in the gel after auxiliary operations are completed to allow immediate recovery of the fluid from the formation.

Another object of the invention is to provide a system for a blocking gel which can break the gel polymers within a wide range of pH at low to moderate temperatures without interfering with the crosslinking chemistry.

Another object of the invention is to provide an enzyme breaker system which breaks the crosslinked polymer backbone primarily into monosaccharide fragments.

Another object of the invention is to provide an enzyme breaker system for a blocking gel which produces a controlled break at low to moderate temperatures and which decreases the amount and size of residue left in the formation after recovery of the fluid from the formation.

SUMMARY OF THE INVENTION

In the method of the invention, a blocking fluid is formulated by blending together an aqueous fluid, a hydratable polymer, a suitable crosslinking agent for crosslinking the hydratable polymer to form a polymer gel. An enzyme breaker which is effective to degrade the polymer gel at temperatures between about 60° F. and 140° F. and at pH's between about 1.0 to 8.0 is either incorporated internally within the gel prior to gellation, externally applied to the gelled blocking fluid or a mixture of both.

Preferably, the gellable blocking fluid is formulated by blending together the aqueous fluid, hydratable polymer, and crosslinking agent for crosslinking the hydratable polymer. If an enzyme breaker is incorporated internally, the enzyme breaker is added at this step. The fluid is pumped to a desired location within the well bore and allowed to gel and coat a production formation. After completing the workover operation, the enzyme breaker degrades the polymer. Prior to degradation an external breaker may be applied whether or not an internal breaker was previously incorporated. After degradation the fluid can be pumped from the subterranean formation to the well surface. The enzyme breaker has activity in the pH range of about 1.0 to 8.0 and is effective to attack only specific linkages in the cross-linked polymer gel.

Preferably, the hydratable polymer is selected from the group consisting of celluloses and derivatized celluloses. The preferred enzyme breaker is a hydrolase.

In a particularly preferred method for practicing the invention, the gellable blocking fluid is formulated by blending together an aqueous fluid, a hydratable cellulose polymer having repeating units of glucose, a suitable crosslinking agent for crosslinking the hydratable polymer to form a polymer gel and an enzyme breaker. The pH of the blended fluid is about 3.0 to 4.0 and the cross-linked fluid is pumped to a desired location in the well-bore to coat the production formation. After additional enzyme breaker is applied externally, the enzyme breaker reduces the viscosity of the fluid, whereby the fluid can be pumped from the subterranean formation back to the well surface.

Additional objects, features and advantages will be apparent in the written description which follows.

DETAILED DESCRIPTION OF THE INVENTION

In order to practice the method of the invention, an aqueous blocking gel fluid is first prepared by blending a hydratable polymer into an aqueous fluid. The aqueous fluid could be, for example, water, brine, or water-alcohol mixtures. Any suitable mixing apparatus may be used for this procedure. In the case of batch mixing, the hydratable polymer and the aqueous fluid are blended for a period of time which is sufficient to form a hydrated solution. The hydratable polymer useful in the present invention can be any of the hydratable polysaccharides familiar to those in the well service industry. These polysaccharides are capable of gelling in the presence of a crosslinking agent to form a gelled based fluid. For instance, suitable hydratable polysaccharides are the galactomannan gums, guars, derivatized guars, cellulose and cellulose derivatives. Specific examples are guar gum, guar gum derivative, locust bean gum, caraya gum, carboxymethyl cellulose, cellulose, carboxymethyl hydroxyethyl cellulose and hydroxyethyl cellulose. Traditionally cellulose based polymers are preferred due to their low residue content after degradation. The preferred gelling agents are cellulose, carboxymethyl cellulose, carboxymethyl hydroxyethyl cellulose, hydroxyethyl cellulose. The most preferred gelling agents are hydroxyethyl cellulose and carboxymethyl hydroxyethyl cellulose.

The hydratable polymer is added to the aqueous fluid with the most preferred concentration range for the present invention is about 0.5% to about 1.5% by weight.

In addition to the hydratable polymer, the blocking gel fluids of the invention include a crosslinking agent. The crosslinking agent can be any of the conventionally used crosslinking agents which are known to those skilled in the art. For instance, in recent years, gellation of the hydratable polymer has been achieved by crosslinking these polymers with metal ions including aluminum, antimony, zirconium and titanium containing compounds including the so-called organotitinates. See, for instance, U.S. Pat. No. 4,514,309. Transition metals are preferred. Zirconium crosslinking agents are most preferred.

In the case of the zirconium crosslinkers, the crosslinking agent is any material which supplies zirconium ions in solution. Thus the crosslinking agent can be any convenient source of zirconium ions. A preferred crosslinking additive is sodium zirconium lactate. This crosslinking additive is preferably present in the range from about 0.05% to about 0.75% by weight of the aqueous fluid. Preferably, the concentration of crosslinking agent is in the range from about 0.1% to about 0.2% by weight of the aqueous fluid.

Breakers commonly used in the industry for this particular application include chemical oxidizers such as persulfates, oxidizer-antioxidizer mixtures such as persulfates and triethanolamine and organic materials such as sucrose or polyglycolic acid.

The present invention provides a novel breaker system which is particularly well adapted for use in blocking gels. The enzyme breaker system is a mixture of highly specific enzymes which, for all practical purposes, completely degrades the polysaccharide backbone of the cross-linked blocking gel. The enzyme breakers of the invention are hydrolases that are active in the pH range of about 1.0 to 8.0. The preferred pH range is about 3.0 to 4.0. These same enzymes are active at low to moderate temperatures of about 60° F. to 140° F. The enzyme breakers can be internally incorporated within the gel, externally applied to the gel or a mixture of both. When the enzyme breakers are added depends on the conditions of the procedure. The preferred method of application is a mixture of both of the above techniques.

Using cellulose or derivatized cellulose as the polysaccharide polymer of the blocking gel, the specific enzyme breakers attack the glucosidic linkages of the cellulose backbone, breaking the backbone into fragments. The fragments are broken down into the D-glucose monosaccharides. The preferred enzymes are any enzymes or combination of enzymes that attack the glucosidic linkages of the cellulose polymer backbone and degrade the polymer into mostly monosaccharide units, such as cellulase, hemicellulase, glucosidase, endo-xylanase, exo-xylanase and the like. The two preferred enzymes are commonly called exo and endo xylanases. The preferred enzymes for this cellulose based system specifically hydrolyze the exo(1,4)-$\beta$-D-glucosidic and the endo(1,4)-$\beta$-D-glucosidic linkages between the monosaccharide units in the cellulose backbone and the (1,4)-$\beta$-D-glucosidic linkage of cellulose. The preferred xylanases are commercially available from Novo Nordisk of Norway as "SP-431". The preferred enzyme mixture is in a 1:4 (weight/weight [w/w]) solution of exo(1,4)-$\beta$-D-xylanase and endo(1,4)-$\beta$-D-xylanase. If the enzyme breaker is incorporated internally within the gel, the xylanases should be present in the range from about 0.1% to about 1.0% by volume, based on the total volume of aqueous fluid. If the enzyme is applied externally, then the xylanase mixture should be used in the range from about 10% to 100% based on the total volume of blocking gel applied most preferably at least 50%. If the enzymes are used both internally and externally, then the xylanase mixture should be used in the range of 0.1% to 1.0% internally and 10% and 100% externally. External applications are pumped through the tubing to the location of the blocking gel within the production zone, which evenly disperses the enzymes for the best results. Unexpectedly, this combination of enzymes degrades the blocking gel into a solution of mostly monosaccharide units. "Mostly monosaccharide units" means that the gel polymer backbone is reduced to a solution of more than about 90% monosaccharide units, preferably more than about 95% monosaccharide units. Adding additional enzymes or oxidants to this system substantially decreases the effect of the enzyme breakers of the invention on the gel's polysaccharide backbone.

In the method of the invention, the pH of the polysaccharide based fluid is adjusted to about 2 to 5 through the use of a suitable buffer or acid. Preferably, the gel pH is about 3.65 which enhances the gel strength. The optimum pH range is from about 3.0 to 4.0. Any conventional buffer or acid can be used to adjust the pH, for instance hydrochloric acid.

In a typical blocking gel operation, the blocking gel fluid is pumped at a rate sufficient to coat the formation. A typical blocking gel treatment would be conducted by hydrating a 50 to 120 pounds per 1000 gallons of fluid (ppt) D-glucose based polymer, such as cellulose, in a light to a heavy brine, for example fresh water to a 14.5 pounds per gallon (ppg) $CaCl_2/CaBr_2$.

The following examples are intended to illustrate and not limit the invention:

EXAMPLE

The use of a Gel Damage Permeability Test assesses the recovery of permeability of the pore after degradation of the blocking gel fluid polymer. For this test, a test core is drilled from a sandstone formation sample. The dimensions of the core are carefully measured. The cross sectional area (A) and the length of the core (L) are recorded.

The core is then placed in a solution of a light brine which will be used to simulate a formation brine. The light brine can be made of potassium chloride, sodium chloride, calcium chloride, magnesium chloride, or a combination of these or any salt which would be determined from an analysis of actual formation water. The core is vacuum saturated in the brine. The core is then placed in a core holder. The core and core holder is then placed in a core test apparatus such as a Hassler Core Test Cell. This apparatus allows pressure to be applied in a radial and an axial direction. The top and bottom of the core are exposed to the flow of the brine.

The brine is then flowed through the core by using a pump or a pressure drive system. The Rate of flow (Q) in units/time and the pressure (P) in psi are recorded. The permeability of the core is then calculated using Darcy's equation:

$$K = \frac{\mu Q A}{\Delta P L}$$

where $\mu$ is the viscosity measured in centipoises and K is a constant.

The direction of the initial flow of the brine through the core is the production direction. The direction of flow is reversed to simulate injection of a fluid into a well. This is termed "injection direction."

The blocking gel is prepared by first hydrating carboxymethyl hydroxyethyl cellulose (CMHEC). 0.100 ppt of CMHEC (all concentrations are given as final concentrations) is added to sufficient isopropyl alcohol to form a slurry. The slurry is added to a circulated mixture of 7.5 ppt ferrotrol 110-fumaric acid in 2% KCl. The gel is circulated for 30 minutes to allow complete hydration. After hydration, the pH is checked and should be between 3.0 and 4.0 with 3.65 as optimum. Then 1.5 gpt of a sodium zirconium lactate solution (7% by weight $ZrO_2$) is added.

The blocking gel is injected at 1000 psi and the flow and amount of effluent is recorded. This injection can be maintained for any given length of time. The time is determined by the time it will take to perform the workover operations and/or the time the enzyme will take to degrade the fluid if applied internally.

The direction of flow is then reversed to the production direction and the flow is again measured. The permeability is then calculated again using Darcy's equation. The two values are used to calculate percent damage.

The flow is reversed to the injection direction and 100 ppt of external enzyme breaker at 25 IU/g is injected or 10 ppt of ammonium persulfate with 10 ppt of copper ethylene diaminetetraacetic acid. The enzyme breaker is a 1:4 (w/w) solution of exo(1,4)-$\beta$-D-xylanase and endo(1,4)-$\beta$-D-xylanase. One IU equals the amount of enzyme that hydrolyzes 1 $\mu$mole of substrate (either cellulose or xylose) per minute at 25° C. under optimal conditions of measurement. The plug is allowed to stand for a given time period.

The permeability is then measured in the production direction and a final permeability is calculated. The percent damage is calculated using the initial and final permeability. Any additional treatment is done in the manner of the preceding paragraph. The results are shown in the Tables following:

TABLE I

Clean Plug Damage Permeability Test
Berea Sandstone Core Length = 5.08 Area = 5.069

| 1 | INITIAL PRESSURE | PERMEABILITY VOL | TIME | PERM, md | AVERAGE | % REGAIN | PORE VOL |
|---|---|---|---|---|---|---|---|
|  | 48.00 | 54.65 | 809.89 | 11.52 |  |  | 4.39 |
|  | 47.50 | 20.69 | 390.62 | 9.14 |  |  | 5.82 |
|  | 49.50 | 10.16 | 191.31 | 8.79 |  |  | 6.52 |
|  | 51.00 | 14.49 | 247.00 | 9.43 |  |  | 7.53 |
|  | 50.00 | 26.05 | 493.92 | 8.64 |  |  | 9.33 |
|  | 50.00 | 5.20 | 105.50 | 8.08 |  |  | 10.07 |
|  | 49.50 | 19.81 | 406.19 | 8.07 |  |  | 11.44 |
|  | 52.00 | 12.15 | 237.06 | 8.08 | 8.08 |  | 12.28 |
| 2 Clean Plug |  |  | Blocking | Gel |  |  |  |
|  | 1000.00 | 3.00 | 3600.00 | 0.01 |  |  |  |
| 3 EXTERNAL BREAKER ENZYME at pH-3.0 with HCl |  |  |  |  |  |  |  |
| 4 REGAIN | 100.00 | 100.00 | 396.28 | 20.68 |  | 256.04 | 18.36 |
|  | 109.50 | 39.11 | 396.28 | 7.39 |  | 91.45 | 21.06 |
|  | 50.00 | 2.72 | 67.28 | 6.63 |  | 82.04 | 21.25 |
|  | 49.00 | 31.50 | 825.58 | 6.38 |  | 79.01 | 23.43 |
|  | 50.00 | 13.62 | 268.17 | 8.32 |  | 103.07 | 24.37 |
|  | 47.50 | 74.64 | 1650.60 | 7.80 |  | 96.59 | 29.53 |
|  | 47.00 | 22.51 | 503.17 | 7.80 |  | 96.58 | 31.09 |
|  | 50.00 | 22.70 | 481.44 | 7.73 |  | 95.68 | 32.66 |
|  | 49.00 | 39.26 | 850.61 | 7.72 |  | 95.57 | 35.37 |
|  | 49.00 | 5.06 | 110.58 | 7.65 |  | 94.75 | 35.72 |
|  | 49.00 | 2.78 | 60.00 | 7.75 |  | 95.94 | 35.92 |
|  |  |  |  | 7.52 |  | 95.49 |  |

TABLE II

Clean Plug Damage Permeability Test
Berea Sandstone Core Length = 6.35 Area = 11.39 Pore Vol. = 14.46

| 1 | INITIAL PRESSURE | PERME-ABILITY VOL | TIME | PERM. md | AVERAGE | % REGAIN | PORE VOL |
|---|---|---|---|---|---|---|---|
| | 50.00 | 8.85 | 60.12 | 24.13 | | | 0.61 |
| | 48.00 | 54.65 | 809.89 | 11.52 | | | 4.39 |
| | 47.50 | 20.69 | 390.62 | 9.14 | | | 5.82 |
| | 49.50 | 10.16 | 191.31 | 8.79 | | | 6.53 |
| | 51.00 | 14.49 | 247.00 | 9.43 | | | 7.53 |
| | 50.00 | 26.05 | 493.92 | 8.65 | | | 9.33 |
| | 50.00 | 5.56 | 110.31 | 8.26 | | | 9.71 |
| | 50.00 | 5.20 | 105.50 | 8.08 | | | 10.07 |
| | 49.50 | 19.81 | 406.19 | 8.08 | | | 11.44 |
| | 52.00 | 12.15 | 237.06 | 8.08 | 8.08 | | 12.28 |
| 2 Clean Plug 10 | | | Blocking | Gel | | | |
| | 1000.00 | 3.00 | 3600.00 | 0.01 | | | |
| 3 EXTERNAL BREAKER ENZYME at pH-3.0 with HCl | | | | | | | |
| 4 REGAIN | 100.00 | 100.00 | 396.28 | 20.68 | | 256.05 | 18.36 |
| | 109.50 | 39.11 | 396.28 | 7.39 | | 91.45 | 21.06 |
| | 50.00 | 2.72 | 67.28 | 6.63 | | 82.04 | 21.25 |
| | 49.00 | 31.50 | 825.58 | 6.38 | | 79.01 | 23.43 |
| | 50.00 | 13.62 | 268.17 | 8.33 | | 103.07 | 24.37 |
| | 47.50 | 74.64 | 1650.60 | 7.80 | | 96.60 | 29.53 |
| | 47.00 | 22.51 | 503.17 | 7.80 | | 96.58 | 31.09 |
| | 50.00 | 22.70 | 481.44 | 7.73 | | 95.68 | 32.66 |
| | 49.00 | 39.26 | 850.61 | 7.72 | | 95.57 | 35.38 |
| | 49.00 | 5.06 | 110.58 | 7.65 | 8.81 | 94.75 | 35.73 |
| | 49.00 | 2.78 | 60.00 | 7.75 | | 95.94 | 35.92 |

TABLE III

Clean Plug Damage Permeability Test
Berea Sandstone Core Length = 5.08 Area = 5.07 Pore Vol. = 5.15

| 1 | INITIAL PRESSURE | PERME-ABILITY VOL | TIME | PERM. md | AVERAGE | % REGAIN | PORE VOL |
|---|---|---|---|---|---|---|---|
| | 159.00 | 11.15 | 111.84 | 9.24 | | | 2.17 |
| | 161.00 | 8.99 | 60.00 | 13.71 | | | 3.91 |
| | 166.00 | 8.99 | 60.00 | 13.30 | | | 5.66 |
| | 167.00 | 8.99 | 60.00 | 13.22 | | | 7.40 |
| | 168.00 | 8.99 | 60.00 | 13.14 | | | 9.15 |
| | 169.00 | 8.99 | 60.00 | 13.06 | | | 10.89 |
| | 171.00 | 8.99 | 60.00 | 12.91 | | | 12.64 |
| | 173.00 | 8.99 | 60.00 | 12.76 | | | 14.38 |
| | 174.00 | 8.99 | 60.00 | 12.68 | | | 16.13 |
| | 175.00 | 8.99 | 60.00 | 12.61 | | | 17.88 |
| | 175.00 | 8.99 | 60.00 | 12.61 | | | 19.62 |
| | 175.00 | 8.99 | 60.00 | 12.61 | 12.63 | | 21.37 |
| 2 Clean Plug 10 | | Fluid Loss | | | | | |
| | 1000.00 | 12.25 | 1500.00 | 0.12 | | | |
| 3 EXTERNAL BREAKER ENZYME at pH-3.0 with HCl | | | | | | | |
| 4 REGAIN | 182.00 | 8.99 | 60.00 | 12.13 | | 96.02 | 23.11 |
| | 185.00 | 9.71 | 65.10 | 11.88 | | 94.03 | 25.00 |
| | 185.00 | 8.99 | 60.00 | 11.93 | | 94.46 | 26.74 |
| | 161.00 | 9.15 | 60.33 | 13.88 | | 109.87 | 28.52 |
| | 163.00 | 9.62 | 63.19 | 13.76 | | 108.93 | 30.39 |
| | 170.00 | 15.48 | 102.57 | 13.08 | | 103.54 | 33.39 |
| | 173.00 | 18.00 | 119.88 | 12.78 | | 101.23 | 36.89 |
| | 174.00 | 9.70 | 63.79 | 12.87 | | 101.92 | 38.77 |
| | 174.00 | 9.37 | 61.80 | 12.83 | | 101.63 | 40.59 |
| | 174.00 | 9.40 | 60.00 | 13.26 | | 105.01 | 42.42 |
| | 174.00 | 9.40 | 60.00 | 13.26 | | 105.01 | 44.24 |
| | | | | | | 101.97 | |
| | | | | | | | 227.85 |

TABLE IV

Clean Plug Damage Permeability Test
Berea Sandstone Core Length = 7.13 Area = 11.39 Pore Vol. = 5.15

| 1 | INITIAL PRESSURE | PERMEABILITY VOL | TIME | PERM. md | AVERAGE | % REGAIN | PORE VOL |
|---|---|---|---|---|---|---|---|
|  | 41.50 | 45.92 | 267.32 | 38.06 |  |  | 8.92 |
|  | 38.00 | 9.42 | 61.50 | 37.06 |  |  | 10.75 |
|  | 38.00 | 11.93 | 77.97 | 37.03 |  |  | 13.06 |
|  | 37.50 | 11.74 | 75.67 | 38.04 |  |  | 15.34 |
|  | 37.00 | 14.44 | 94.87 | 37.83 |  |  | 18.15 |
|  | 37.00 | 9.11 | 60.07 | 37.69 |  |  | 19.92 |
|  | 35.50 | 8.79 | 60.44 | 37.67 | 37.63 |  | 21.62 |
| 2 Clean Plug 10 Fluid Loss Test OXIDANT | | | | | | | |
|  | 1000.00 | 27.90 | 1500.00 | 0.17 |  |  |  |
| 3 EXTERNAL BREAKER ENZYME at pH-3.0 with HCl | | | | | | | |
| 4 REGAIN | 52.00 | 8.99 | 60.00 | 26.50 |  | 70.42 | 23.37 |
|  | 51.00 | 9.71 | 65.10 | 26.89 |  | 71.47 | 25.25 |
|  | 49.00 | 8.99 | 60.00 | 28.12 |  | 74.73 | 27.00 |
|  | 45.00 | 9.15 | 60.33 | 30.99 |  | 82.37 | 28.78 |
|  | 44.00 | 9.62 | 63.19 | 31.82 |  | 84.56 | 30.64 |
|  | 44.00 | 15.48 | 102.57 | 31.54 |  | 83.83 | 33.65 |
|  | 44.00 | 9.02 | 60.00 | 31.42 |  | 83.50 | 35.40 ERR |
| HCl Treatment 15% | 36.00 | 6.72 | 49.10 | 34.96 |  | 92.91 | 26.71 |
|  | 36.00 | 8.21 | 60.00 | 34.95 |  | 92.89 | 38.30 |
|  | 35.00 | 8.21 | 60.00 | 35.95 |  | 95.54 | 39.89 |
|  | 35.00 | 8.21 | 60.00 | 35.95 |  | 95.54 | 41.49 |
|  | 35.00 | 8.21 | 60.00 | 35.95 |  | 95.54 | 43.08 |

The invention has several advantages. The blocking gel fluid and method permits the formation of a blocking gel to protect the production formation from damage during auxiliary or workover operations. Yet the invention allows the controlled reduction of the viscosity of the blocking gel so that the blocking gel "breaks" at the conclusion of the auxiliary operations. The breaker system is active at low to moderate temperatures commonly found in subterranean foundations. These breaks produce mostly monosaccharide fragments, thereby facilitating removal of the residue.

While the invention is shown in only one of its forms, it is not thus limited but is susceptible to various changes and modifications without departing from the invention's spirit.

What is claimed is:

1. A method of forming a blocking gel within a well bore within a subterranean formation comprising the steps of:
   formulating a gellable blocking fluid by blending together an aqueous fluid, a hydratable polymer, a suitable crosslinking agent for crosslinking a hydratable polymer to form a polymer gel and an original source of enzyme breaker;
   pumping the cross-linked polymer gel to a desired location within the well bore;
   applying additional enzyme breaker to the previously cross-linked polymer gel;
   allowing the combination of original and additional enzyme breaker to degrade the cross-linked polymer, whereby the fluid can be removed from the subterranean formation to the well surface;
   wherein the combination of enzyme breaker has activity in the pH range of about 1.0 to 8.0 and effective to attack only specific linkages in the cross-linked polymer gel.

2. The method of claim wherein the hydratable polymer is selected from the group consisting of cellulose and derivatized celluloses.

3. The method of claim 1, wherein the enzyme breakers are hydrolases.

4. A method of forming a blocking gel within a well bore within a subterranean formation comprising the steps of:
   formulating a gellable blocking fluid by blending together an aqueous fluid, a hydratable cellulose polymer having repeating units of glucose linked by glucosidic linkages, a suitable crosslinking agent for crosslinking a hydratable polymer to form a polymer gel and an original source of enzyme breaker;
   pumping the cross-linked polymer gel to a desired location within the well bore;
   applying additional enzyme breaker to the previously crosslinked polymer gel;
   allowing the combination of original and additional enzyme breaker to degrade the cross-linked polymer, whereby the fluid can be removed from the subterranean formation to the well surface;
   wherein the enzyme breaker has activity in the pH range of about 1.0 to 8.0 and effective to attack only specific linkages in the cross-linked polymer gel.

5. The method of claim 4 whereby the combination of enzyme breaker is specific to attack the glucosidic linkages of the cross-linked polymer gel to reduce the polymer to a solution principally of cellobiose and glucose.

6. The method of claim 4 whereby the enzyme breaker has activity in the pH rang of about 2.0 to 8.0.

7. A method of forming a temporary blocking gel within a well bore within a subterranean formation comprising the steps of:
   formulating a gellable blocking fluid by blending together an aqueous fluid, a hydratable cellulose polymer having repeating units of glucose linked by (1,4)-$\beta$-D glucosidic linkages, a suitable crosslinking agent for crosslinking a hydratable polymer to form a polymer gel and an original source of enzyme breaker;

pumping the cross-linked polymer gel to a desired location within the well bore;

applying additional enzyme breaker to the previously cross-linked polymer gel;

allowing the combination of original and additional enzyme breaker to degrade the cross-linked polymer, whereby the fluid can be removed from the subterranean formation to the well surface;

wherein the combined enzyme breaker is effective to attack the 1,4-$\beta$-D glucosidic linkage in the cross-linked polymer gel.

8. The method of claim 7, wherein the enzyme breakers are both selected from the group consisting of cellulase, hemicellulases, glucosidases, endo-xylanases, exo-xylanases and combinations thereof.

9. The method of claim 8, wherein the enzyme breaker is a 1:4 solution of exo(1,4)-$\beta$-D-xylanase and endo(1,4)-$\beta$-D-xylanase.

10. A method of forming a blocking gel within a well bore within a subterranean formation comprising the steps of:

formulating a gellable blocking fluid by blending together an aqueous fluid, a hydratable polymer, a suitable crosslinking agent for crosslinking the hydratable polymer to form a polymer gel and an enzyme breaker;

pumping the cross-linked polymer gel to a desired location within the well bore;

allowing the enzyme breaker to degrade the cross-linked polymer, whereby the fluid can be removed from the subterranean formation to the well surface;

wherein the enzyme breaker has activity in the pH range of about 1.0 to 8.0 and effective to attack only specific linkages in the cross-linked polymer gel.

11. The method of claim 10, wherein the hydratable polymer is selected from the group consisting of cellulose and derivatized celluloses.

12. The method of claim 10, wherein the enzyme breaker is a hydrolase.

13. A method of forming a blocking gel within a well bore within a subterranean formation comprising the steps of:

formulating a gellable blocking fluid by blending together an aqueous fluid, a hydratable cellulose polymer having repeating units of glucose linked by glucosidic linkages, a suitable crosslinking agent for crosslinking the hydratable polymer to form a polymer gel and an enzyme breaker;

pumping the cross-linked polymer gel to a desired location within the well bore;

allowing the enzyme breaker to degrade the cross-linked polymer, whereby the fluid can be removed from the subterranean formation to the well surface;

wherein the enzyme breaker has activity in the pH range of about 1.0 to 8.0 and effective to attack only specific linkages in the cross-linked polymer gel.

14. The method of claim 13 whereby the enzyme breaker is specific to attack the glucosidic linkages of the cross-linked polymer gel to reduce the polymer to a solution principally of cellobiose and glucose.

15. The method of claim 13 whereby the enzyme breaker has activity in the pH range of about 2.0 to 8.0.

16. A method of forming a temporary blocking gel within a well bore within a subterranean formation comprising the steps of:

formulating a gellable blocking fluid by blending together an aqueous fluid, a hydratable cellulose polymer having repeating units of glucose linked by (1,4)-$\beta$-D glucosidic linkages, a suitable crosslinking agent for crosslinking the hydratable polymer to form a polymer gel and an enzyme breaker;

pumping the cross-linked polymer gel to a desired location within the well bore;

allowing the enzyme breaker to degrade the cross-linked polymer, whereby the fluid can be removed from the subterranean formation to the well surface;

wherein the enzyme breaker is effective to attack the 1,4-$\beta$-D glucosidic linkage in the cross-linked polymer gel.

17. The method of claim 16, wherein the enzyme breaker is selected from the group consisting of cellulase, hemicellulases, glucosidases, endo-xylanases, exo-xylanases and combinations thereof.

18. The method of claim 17, wherein the enzyme breaker is a 1:4 solution of exo(1,4)-$\beta$-D-xylanase and endo(1,4)-$\beta$-D-xylanase.

19. A method of forming a blocking gel within a well bore within a subterranean formation comprising the steps of:

formulating a gellable blocking fluid by blending together an aqueous fluid, a hydratable polymer, a suitable crosslinking agent for crosslinking the hydratable polymer to form a polymer gel;

pumping the cross-linked polymer gel to a desired location within the well bore;

applying an enzyme breaker to the previously cross-linked polymer gel;

allowing an enzyme breaker to degrade the cross-linked polymer gel, whereby the fluid can be removed from the subterranean formation to the well surface;

wherein the enzyme breaker has activity in the pH range of about 1.0 to 8.0 and effective to attack only specific linkages in the cross-linked polymer gel.

20. The method of claim 19, wherein the hydratable polymer is selected from the group consisting of cellulose and derivatized celluloses.

21. The method of claim 19, wherein the enzyme breaker is a hydrolase.

22. A method of forming a blocking gel within a well bore within a subterranean formation comprising the steps of:

formulating a gellable blocking fluid by blending together an aqueous fluid, a hydratable cellulose polymer having repeating units of glucose linked by glucosidic linkages, a suitable crosslinking agent for crosslinking the hydratable polymer to form a polymer gel;

pumping the cross-linked polymer gel to a desired location within the well bore;

applying an enzyme breaker to the previously cross-linked polymer gel;

allowing the enzyme breaker to degrade the cross-linked polymer, whereby the fluid can be removed from the subterranean formation to the well surface;

wherein the enzyme breaker has activity in the pH range of about 1.0 to 8.0 and effective to attack only specific linkages in the cross-linked polymer gel.

23. The method of claim 22 whereby the enzyme breaker is specific to attack the glucosidic linkages of the cross-linked polymer gel to reduce the polymer to a solution principally of cellobiose and glucose.

24. The method of claim 22 whereby the enzyme breaker has activity in the pH range of about 2.0 to 8.0.

25. A method of forming a temporary blocking gel within a well bore within a subterranean formation comprising the steps of:

formulating a gellable blocking fluid by blending together an aqueous fluid, a hydratable cellulose polymer having repeating units of glucose linked by (1,4)-$\beta$-D glucosidic linkages, a suitable cross-linking agent for crosslinking the hydratable polymer to form a polymer gel;

pumping the cross-linked polymer gel to a desired location within the well bore;

applying an enzyme breaker to the previously cross-linked polymer gel;

allowing the enzyme breaker to degrade the cross-linked polymer, whereby the fluid can be removed from the subterranean formation to the well surface;

wherein the enzyme breaker is effective to attack the 1,4-$\beta$-D glucosidic linkage in the cross-linked polymer gel.

26. The method of claim 25, wherein the enzyme breaker is selected from the group consisting of cellulase, hemicellulases, glucosidases, endo-xylanases, exo-xylanases and combinations thereof.

27. The method of claim 26, wherein the enzyme breaker is a 1:4 solution of exo(1,4)-$\beta$-D-xylanase and endo(1,4)-$\beta$-D-xylanase.

* * * * *